United States Patent
Jardine et al.

(10) Patent No.: US 12,280,780 B2
(45) Date of Patent: Apr. 22, 2025

(54) CONTROL OF VEHICLE-TO-VEHICLE SEPARATION

(71) Applicant: JAGUAR LAND ROVER LIMITED, Coventry (GB)

(72) Inventors: Fraser Jardine, Coventry (GB); Michael Belcher, Coventry (GB); Simon Nell, Coventry (GB); Daniel Woolliscroft, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 210 days.

(21) Appl. No.: 18/246,309

(22) PCT Filed: Sep. 22, 2021

(86) PCT No.: PCT/EP2021/076119
§ 371 (c)(1),
(2) Date: Mar. 22, 2023

(87) PCT Pub. No.: WO2022/163859
PCT Pub. Date: Mar. 31, 2022

(65) Prior Publication Data
US 2023/0382378 A1 Nov. 30, 2023

(30) Foreign Application Priority Data
Sep. 22, 2020 (GB) ..................... 2014965

(51) Int. Cl.
*B60W 30/16* (2020.01)
*B60W 50/08* (2020.01)

(52) U.S. Cl.
CPC ............ *B60W 30/16* (2013.01); *B60W 50/08* (2013.01); *B60W 2520/10* (2013.01);
(Continued)

(58) Field of Classification Search
CPC ......... B60W 2520/10; B60W 2540/12; B60W 2540/215; B60W 2554/802;
(Continued)

(56) References Cited

U.S. PATENT DOCUMENTS 6,560,525 B1   5/2003  Joyce et al.
6,622,078 B1   9/2003  Kuragaki et al.
(Continued)

FOREIGN PATENT DOCUMENTS

EP      1193106 A1   4/2002
GB      2549846 A    11/2017
(Continued)

OTHER PUBLICATIONS

Japanese Patent Office, Office Action Issued in Application No. 2023-518527, Jan. 23, 2024, 22 pages.
(Continued)

*Primary Examiner* — Yufeng Zhang
(74) *Attorney, Agent, or Firm* — McCoy Russell LLP

(57) ABSTRACT

A control system for a host vehicle operable in an automated mode, wherein the control system is configured to: receive a driver selection from a first human-machine interface of a vehicle-to-vehicle separation when vehicle speed falls below a threshold; store the vehicle-to-vehicle separation when vehicle speed falls below the threshold; receive a driver intervention from a second human-machine interface to modify the vehicle-to-vehicle separation; and update the stored vehicle-to-vehicle separation based on the received driver intervention when the vehicle speed later falls below the threshold.

20 Claims, 2 Drawing Sheets

(52) U.S. Cl.
CPC ... *B60W 2540/12* (2013.01); *B60W 2540/215* (2020.02); *B60W 2554/802* (2020.02)

(58) Field of Classification Search
CPC .. B60W 2754/30; B60W 30/16; B60W 30/17; B60W 50/08
See application file for complete search history.

(56) References Cited

U.S. PATENT DOCUMENTS

| | | |
|---|---|---|
| 9,381,918 B1 | 7/2016 | Ferguson et al. |
| 2005/0187697 A1 | 8/2005 | Arai et al. |
| 2005/0216169 A1 | 9/2005 | Arai |
| 2010/0268432 A1 | 10/2010 | Arai et al. |
| 2012/0065863 A1* | 3/2012 | Takagi ............ B60W 30/16 701/96 |
| 2018/0099673 A1 | 4/2018 | Pedlar et al. |
| 2019/0001975 A1 | 1/2019 | Liu et al. |
| 2019/0001976 A1 | 1/2019 | Liu et al. |
| 2019/0232961 A1 | 8/2019 | Baier et al. |
| 2022/0144270 A1* | 5/2022 | Takahama ............ B60W 10/04 |

FOREIGN PATENT DOCUMENTS

| | | |
|---|---|---|
| JP | 2002029285 A | 1/2002 |
| JP | 2003335147 A | 11/2003 |
| JP | 2005231491 A | 9/2005 |
| JP | 2005280397 A | 10/2005 |
| JP | 2005343268 A | 12/2005 |
| JP | 3937728 B2 | 6/2007 |
| JP | 2009280014 A | 12/2009 |
| JP | 2010253984 A | 11/2010 |
| WO | 2009141693 A1 | 11/2009 |

OTHER PUBLICATIONS

Great Britain Intellectual Property Office, Search Report under Section 17 Issued in Application No. GB2014965.4, Apr. 9, 2021, 5 pages.
ISA European Patent Office, International Search Report and Written Opinion Issued in Application No. PCT/EP2021/076119, Feb. 7, 2022, WIPO, 12 pages.

* cited by examiner

CONTROL OF VEHICLE-TO-VEHICLE SEPARATION

CROSS REFERENCE TO RELATED APPLICATIONS

The present application is a U.S. National Phase of International Application No. PCT/EP2021/076119 entitled "CONTROL OF VEHICLE-TO-VEHICLE SEPARATION," and filed on Sep. 22, 2021. International Application No. PCT/EP2021/076119 claims priority to Great Britain Patent Application No. 2014965.4 filed on Sep. 22, 2020. The entire contents of each of the above-listed applications are hereby incorporated by reference for all purposes.

TECHNICAL FIELD

The present disclosure relates to control of vehicle-to-vehicle separation. In particular, but not exclusively, it relates to control of vehicle-to-vehicle separation at a below-threshold vehicle speed (e.g. stopped) in an autonomous, automated or assisted-driving mode.

BACKGROUND

During assisted, automated or autonomous driving, when following another road user at low speed, the distance the vehicle leaves to the other road user at stationary, or "stop gap" may be determined by the vehicle.

The most appropriate distance to leave to the other road user at stationary depends on a number of factors, both objective and subjective. While one can preset the "stop gap" to work in most scenarios, the remaining scenarios often leave the driver of the vehicle desiring a shorter distance to the other road user.

SUMMARY OF THE INVENTION

It is an aim of the present invention to address one or more of the disadvantages associated with the prior art.

According to an aspect of the invention there is provided a control system for a host vehicle operable in an automated driving mode, the control system comprising one or more controllers, wherein the control system is configured to:
  receive a driver selection from a first human-machine interface of a vehicle-to-vehicle separation to be implemented in the automated driving mode when vehicle speed falls below a threshold;
  store the vehicle-to-vehicle separation for implementation in the automated driving mode when vehicle speed falls below the threshold;
  receive a driver intervention from a second human-machine interface when the vehicle speed is below the threshold to modify the vehicle-to-vehicle separation; and
  update the stored vehicle-to-vehicle separation in dependence on the received driver intervention, to be implemented when the vehicle speed later falls below the threshold and the host vehicle is operable in the automated driving mode.

Throughout this disclosure, the term "automated" is used as a generic term to encompass and include terms of art such as "assisted", "self-driving" and "autonomous". No distinction is to be made between these terms unless specifically required by the context.

An advantage is an improved user interface for controlling vehicle-to-vehicle separation (e.g. stop gap) in traffic jams. This is because the driver can set a first, default stop gap using the first HMI (e.g. touchscreen), and can set a second, customized stop gap using the second HMI (e.g. accelerator pedal), for example if the conditions of that traffic jam call for a slightly reduced gap to the vehicle in front.

In some examples, the threshold is a stopping vehicle threshold.

In some examples, the vehicle-to-vehicle separation is selectable from a plurality of selectable values via the first human-machine interface, and wherein the control system is configured to enable, via the driver intervention from the second human-machine interface, adjustment of vehicle-to-vehicle separation between the plurality of selectable values. In some examples, the plurality of selectable values have intervals between 0.25 metres to 1 metres.

In some examples, the control system is configured to enable the updated vehicle-to-vehicle separation to be less than a smallest vehicle-to-vehicle separation selectable from the first human-machine interface.

In some examples, the control system is configured to determine whether the modified vehicle-to-vehicle separation is below a minimum separation, wherein if the modified vehicle-to-vehicle separation is above the minimum separation, the modified vehicle-to-vehicle separation becomes the updated vehicle-to-vehicle separation, and if the modified vehicle-to-vehicle separation is below the minimum separation, the minimum separation becomes the updated vehicle-to-vehicle separation. In some examples, the minimum separation is a value between 1 metres and 4 metres.

In some examples, the automated mode is an adaptive cruise control mode.

In some examples, when vehicle speed is above the threshold, the control system is configured to dynamically control vehicle-to-vehicle separation in dependence on a vehicle speed-dependent target.

In some examples, the threshold is a first threshold, and wherein the control system is configured to:
  when vehicle speed rises above a second threshold greater than the first threshold, revert to the vehicle-to-vehicle separation selected from the first human-machine interface when vehicle speed later falls below the first threshold. In some examples, the second threshold is a value between 15 km/h and 40 km/h.

In some examples, the second threshold is configured to be less than a minimum settable vehicle speed target for the automated mode.

In some examples, the control system is configured to:
  detect driver braking or driver actuation of an inhibit function;
  inhibit the automated mode in dependence on the braking or actuation; and
  revert to the vehicle-to-vehicle separation selected from the first human-machine interface when the automated mode is later active.

In some examples, the second human-machine interface is configured to request drive torque when actuated. In some examples, the second human-machine interface comprises an accelerator. In some examples, the first human-machine interface is a digit-operated interface.

In some examples, updating the stored vehicle-to-vehicle separation comprises measuring the modified vehicle-to-vehicle separation following the driver intervention and a detection that vehicle speed is below the threshold.

According to a still further aspect of the invention there is provided a control system for a host vehicle operable in an automated mode, the control system comprising one or more controllers, wherein the control system is configured to:
maintain a pre-selected vehicle-to-vehicle separation when the host vehicle speed falls below a threshold;
detect a modification in the vehicle-to-vehicle separation due to movement of the host vehicle in response to a driver input when the host vehicle speed is below the threshold; and
store the modified vehicle-to-vehicle separation for implementation when the host vehicle speed next falls below the threshold.

The modification may comprise a reduction in the vehicle-to-vehicle separation.

According to a further aspect of the invention there is provided a control system for a host vehicle operable in an automated mode, the control system comprising one or more controllers, wherein the control system is configured to:
store a first vehicle-to-vehicle separation to be implemented in the automated mode when vehicle speed falls below a first threshold;
receive a driver intervention to modify vehicle-to-vehicle separation;
update the stored first vehicle-to-vehicle separation in dependence on the received driver intervention;
store the updated vehicle-to-vehicle separation to be implemented when the vehicle speed later falls below the first threshold without having exceeded a second threshold; and
revert to the first vehicle-to-vehicle separation when the vehicle speed later falls below the first threshold after having exceeded the second threshold.

An advantage is an improved user interface for controlling vehicle-to-vehicle separation (e.g. stop gap) in traffic jams. This is because different stop gaps are appropriate for different traffic jams, therefore when the vehicle leaves a traffic jam according to the second threshold, the vehicle will automatically revert from the second (customized) stop gap to the first (default) stop gap for the next traffic jam.

According to an aspect of the invention there is provided a vehicle comprising the control system.

According to a further aspect of the invention there is provided a method of controlling a host vehicle operable in an automated mode, the method comprising:
receiving a driver selection from a first human-machine interface of a vehicle-to-vehicle separation to be implemented in the automated mode when vehicle speed falls below a threshold;
storing the vehicle-to-vehicle separation for implementation in the automated mode when vehicle speed falls below the threshold;
receiving a driver intervention from a second human-machine interface when the vehicle speed is below the threshold to modify the vehicle-to-vehicle separation; and
updating the stored vehicle-to-vehicle separation in dependence on the received driver intervention, to be implemented when the vehicle speed falls below the threshold and the host vehicle is operable in the automated mode.

Receiving a driver intervention from a second human-machine interface may comprise determining that the vehicle has moved to a modified vehicle-to-vehicle separation, for example by operation of an accelerator pedal by the driver According to a further aspect of the invention there is provided a method of controlling a host vehicle operable in an automated mode, the method comprising:

storing a first vehicle-to-vehicle separation to be implemented in the automated mode when vehicle speed falls below a first threshold;
receiving a driver intervention to modify vehicle-to-vehicle separation;
updating the stored first vehicle-to-vehicle separation in dependence on the received driver intervention;
storing the updated vehicle-to-vehicle separation to be implemented when the vehicle speed later falls below the first threshold without having exceeded a second threshold; and
reverting to the first vehicle-to-vehicle separation when the vehicle speed later falls below the first threshold after having exceeded the second threshold.

According to a still further aspect of the invention there is provided a method of controlling a host vehicle operating in an automated mode, the method comprising:
maintaining a pre-selected vehicle-to-vehicle separation when the host vehicle speed falls below a threshold;
detecting a modification in the vehicle-to-vehicle separation due to movement of the host vehicle in response to a driver input when the host vehicle speed is below the threshold; and
storing the modified vehicle-to-vehicle separation for implementation when vehicle speed next falls below the threshold and the vehicle is in the automated mode.

detecting a modification in the vehicle-to-vehicle separation may comprise determining that the vehicle has moved from the pre-selected vehicle-to-vehicle separation, for example by operation of an accelerator pedal by the driver. The modification may comprise a reduction in the vehicle-to-vehicle separation.

According to a further aspect of the invention there is provided computer software that, when executed, is arranged to perform any one or more of the methods described herein. According to a further aspect of the invention there is provided a non-transitory computer readable medium comprising computer readable instructions that, when executed by a processor, cause performance of any one or more of the methods described herein.

The one or more controllers may collectively comprise: at least one electronic processor having an electrical input for receiving information; and at least one electronic memory device electrically coupled to the at least one electronic processor and having instructions stored therein; and wherein the at least one electronic processor is configured to access the at least one memory device and execute the instructions thereon so as to cause the control system to cause performance of the method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
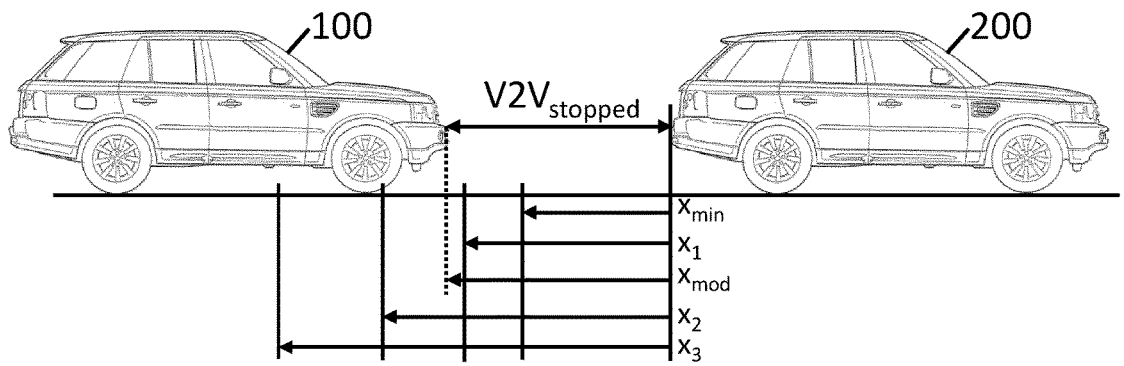
FIG. 1 illustrates an example of vehicles and a vehicle-to-vehicle separation therebetween.

FIG. 1 illustrates an example of a host vehicle 100 in which embodiments of the invention can be implemented. The host vehicle 100 is stopped behind a followed road user 200 (e.g. another, preceding vehicle).

In some, but not necessarily all, examples the host vehicle 100 is a passenger vehicle, also referred to as a passenger car or as an automobile. In other examples, embodiments of the invention can be implemented for other applications, such as commercial vehicles.

The host vehicle 100 is operable in an automated mode. In some, but not necessarily all, examples the automated mode is an adaptive cruise control (ACC) mode.

ACC is a version of cruise control that adapts to the speed of a followed road user 200. Like normal cruise control, ACC will control the speed of the host vehicle 100 to match a speed target. The driver may set the speed target to match a current speed and can then release the accelerator because the vehicle speed will be controlled to automatically maintain vehicle speed at the speed target. The driver can change the speed target during ACC, for example with digit (finger) controls.

The term 'automatic' herein refers to functions that are able to operate without user intervention.

In some examples, the speed target adapts automatically in dependence on traffic sign recognition, if the host vehicle 100 is capable of traffic sign speed limit recognition (camera and processor equipped).

ACC ensures that if the host vehicle 100 is approaching a preceding road user 200 and the road user 200 is travelling at a speed less than the speed target, the host vehicle 100 will automatically slow down to follow the road user 200.

When following, ACC may control the vehicle-to-vehicle (V2V) separation to the followed road user 200 to maintain a target V2V separation or to avoid falling below a minimum V2V separation. If the other road user 200 speeds up again, the host vehicle 100 will automatically speed up until the speed target is reached.

When following, the target V2V separation may be preset or user-configurable. The target V2V separation may be treated as a separation time or as a speed-dependent separation distance. This ensures that the V2V separation increases as vehicle speed increases.

In at least some examples ACC works in stop-start traffic and can be referred to as 'ACC with Stop & Go'. If the followed road user 200 stops, the host vehicle 100 will stop behind the followed road user 200 at a particular V2V separation, labelled '$V2V_{stopped}$' in FIG. 1. This will be called 'stop gap' in the following description, to denote V2V separation when the host vehicle 100 is detectably stopped.

The target stop gap is distinct from the 'following-vehicle' target V2V separation in various ways. The target stop gap can be treated as a distance target that is not dependent on vehicle speed because the host vehicle 100 is not moving. The target stop gap may be user configurable separately from the 'following-vehicle' target V2V separation. This is useful if the driver wants ACC to follow from a long distance but not leave an excessive gap when stopping a traffic jam.

ACC may switch from the 'following-vehicle' target V2V separation to the target stop gap with a blend between the two targets, when the vehicle is detected to be stopping according to a speed sensor (not shown) and/or a zero target speed of ACC.

In the present disclosure, the ACC with Stop & Go does not require a driver resume input (e.g. accelerator pedal input or other driver input) to enable the host vehicle 100 to move again after stopping. In some examples the ACC with Stop & Go may require a driver resume input reactivation if the host vehicle 100 has been stopped for at least a threshold time such as seconds.

Unlike Traffic Jam Assistance, the ACC of the present disclosure enables selection of a high vehicle speed target (e.g. above 60 kph).

In ACC the driver may remain responsible for steering inputs and for supervision of ACC. In ACC, the driver may be able to manually longitudinally control the host vehicle 100 without deactivating ACC. A temporary manual increase in vehicle speed above the speed target may temporarily override conformance to the speed target and/or conformance to a particular V2V separation.

Figure 2:
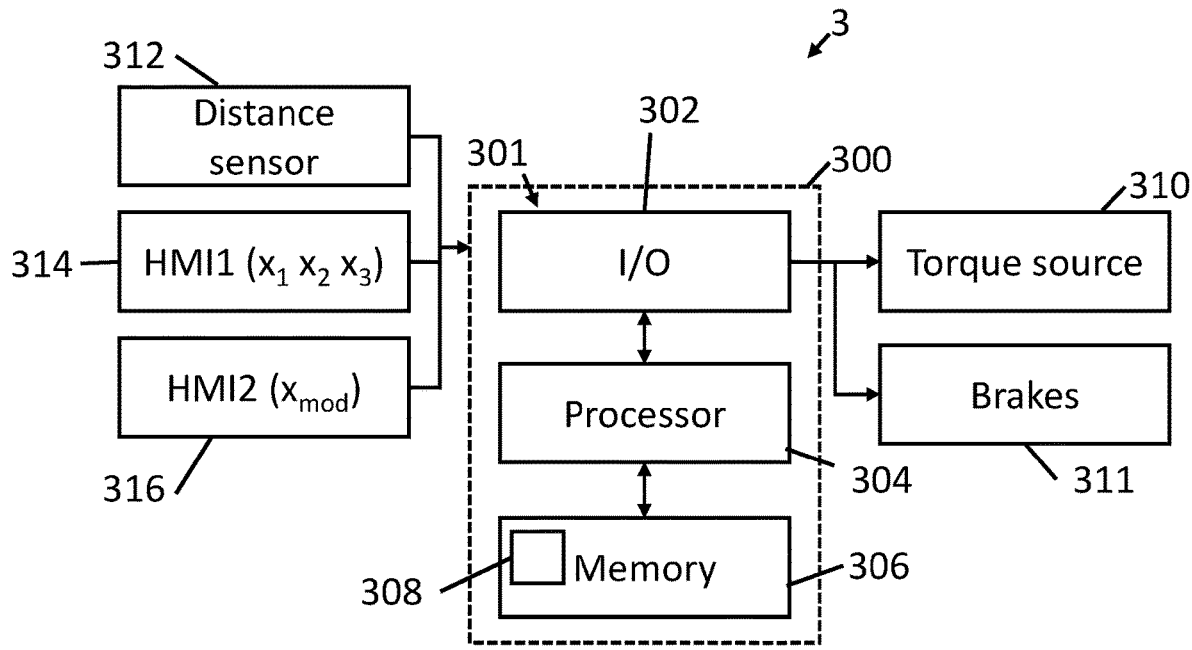
FIG. 2 illustrates an example of a system.

Referring to FIG. 2, the ACC function is controlled by a control system 300. The illustrated control system 300 is configured to control output torque of a torque source 310 to control vehicle speed and position in dependence on a signal from at least one distance-measuring sensor 312. The torque source 310 may comprise an internal combustion engine and/or an electric machine, for example. The distance-measuring sensor 312 may comprise a forward-facing radar sensor or a camera for example, providing distance-dependent information indicative of V2V separation from a followed road user 200 in a same lane as the host vehicle 100.

In some examples the control system 300 can control a vehicle braking system 311 in dependence on the signal from the distance-measuring sensor 312. The vehicle braking system 311 may comprise a friction braking system and/or a regenerative braking system, for example. The host vehicle 100 can therefore both speed up and slow down with traffic.

The control system 300 of FIG. 2 comprises a controller 301. In other examples, the control system 300 may comprise a plurality of controllers on-board and/or off-board the host vehicle 100. In some examples, a control system 300 or a controller 301 may be supplied along with one or more of the other components 310, 311, 312, 314, 316 shown in FIG. 2 as part of a system 3.

The controller 301 of FIG. 2 includes at least one processor 304; and at least one memory device 306 electrically coupled to the electronic processor 304 and having instructions 308 (e.g. a computer program) stored therein, the at least one memory device 306 and the instructions 308 configured to, with the at least one processor 304, cause any one or more of the methods described herein to be performed. The processor 304 may have an interface 302 such as an electrical input/output I/O or electrical input for receiving information and interacting with external components.

Figure 3:
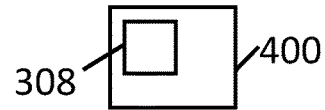
FIG. 3 illustrates an example of a non-transitory computer-readable storage medium.

FIG. 3 illustrates a non-transitory computer-readable storage medium 400 comprising the instructions 308 (computer software).

According to some, but not necessarily all, embodiments of the invention the control system 300 further enables the driver to select a target stop gap using one human-machine interface (HMI), and then perform a fine adjustment using a different HMI (e.g. accelerator pedal) which will be remembered within the same traffic jam/queue.

A first human-machine interface (HMI1 314) enables a driver to select the target stop gap. HMI1 314 may comprise a digit-operated interface such as a touchscreen user interface element, a button, a switch or a dial. HMI1 314 could be a dedicated 'target stop gap control' interface.

HMI1 314 provides a plurality of selectable values of the target stop gap. The selectable values may include at least three values $x_1$, $x_2$, $x_3$ such as close-medium-far as shown in FIG. 1. At least some values fall within the range four metres to six metres. All values may be less than ten metres. All values may be greater than three metres.

The selectable values have large intervals between them for convenience, but this may not suit all drivers or traffic jam contexts. Typical intervals are from the range 0.25 metres to 1 metre.

In an example, the selectable values include approximately 4 metres, approximately 4.5 metres and approximately 5.2 metres. The intervals therebetween are 0.5 metres and 0.7 metres respectively.

A second human-machine interface (HMI2 316) enables the driver to manually override the previously selected target stop gap. In this embodiment HMI2 316 comprises an accelerator (e.g. accelerator pedal). HMI2 316 may enable precise control of the target stop gap, to a value between the above plurality of selectable values. In other words, HMI2 316 enables the target stop gap to be controlled with finer spatial granularity than HMI1 314. In some examples, HMI2 316 enables the target stop gap to be controlled in a substantially continuous manner rather than as a series of discrete intervals as enabled by HMI1 314.

The accelerator pedal 316 is configured to request drive torque when actuated whereas HMI1 314 is not. This enables the driver to creep the host vehicle 100 forward to the desired stop gap that will define the new target stop gap. The driver could initially select target stop gap $x_2$, and then manually creep forward to stop gap $x_{mod}$ as shown in FIG. 1.

The stop gap $x_{mod}$ can then be re-used on subsequent occasions when the host vehicle 100 stops within a traffic jam. In some examples the new target stop gap may be forgotten/discarded when the host vehicle 100 exits the current traffic jam, because drivers typically prefer different stop gaps for different types of traffic jams. For instance, the ideal stop gap in a traffic jam on a motorway or freeway may differ from the ideal stop gap in a city street, an interchange or approaching a merging of lanes.

Use of an accelerator pedal 316 to finely adjust the target stop gap is more intuitive and precise than other forms of control, at least due to the driver's familiarity of the amount of accelerator pedal deflection required to move the host vehicle 100 by a specific amount. In addition, a driver can change their mind by releasing the accelerator pedal 316 and can expect an immediate response.

It is also beneficial, however, to include HMI1 314 for selecting the stop gap and not exclusively rely on the accelerator pedal 316. This is because the control system 300 does not necessarily know the intention of a driver's accelerator input. For example, the driver could creep the host vehicle 100 forwards in order to avoid blocking a junction, without necessarily intending to change the target stop gap. Therefore, a driver may prefer to select a default stop gap from HMI1 314 and only use the accelerator 316 for occasional temporary adjustment. After a traffic jam control will revert to the original setting from HMI1 314.

Figure 4:
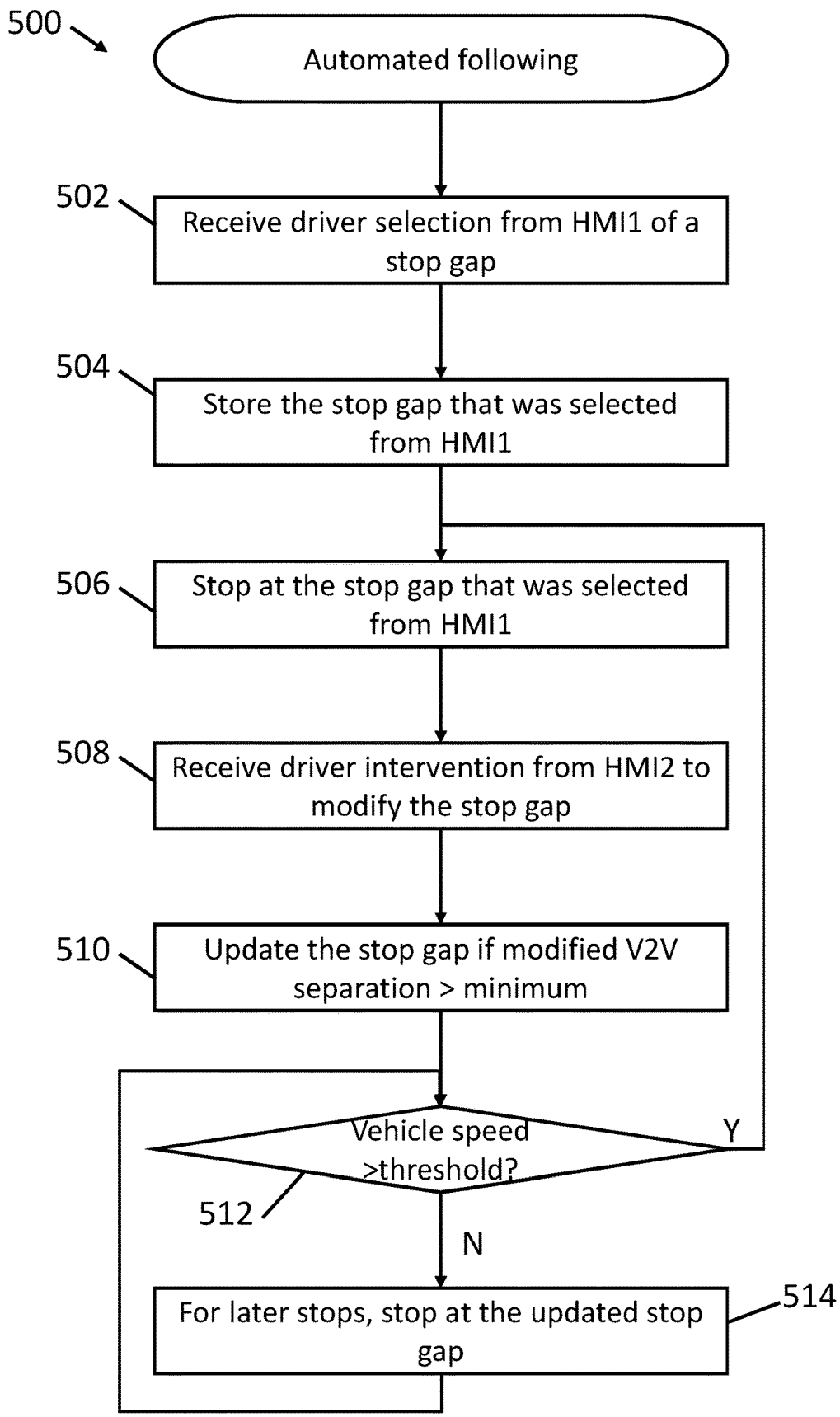
FIG. 4 illustrates an example of a method.

An example control method 500 is provided in FIG. 4, for implementation by the control system 300 during automated following in ACC.

At operation 502, the method 500 comprises receiving a driver selection from HMI1 314 of the target stop gap (V2V separation) to be implemented in ACC when vehicle speed falls below a threshold (e.g. stopping vehicle threshold). The target stop gap may be implemented as a blend from the 'following vehicle' target V2V separation, starting from when vehicle speed falls below the threshold and when the ACC speed target is zero.

Operation 502 could be performed while in ACC or at another time.

At operation 504, the method 500 comprises storing the selected target stop gap for implementation in ACC when vehicle speed falls below the threshold. The target stop gap may be stored in the memory 306 for example.

At operation 506, the method 500 comprises the ACC stopping the host vehicle 100 at the target stop gap of operations 502 and 504, when vehicle speed falls below the threshold. The distance-measuring sensor 316 may provide feedback indicative of the separation distance from the followed road user 200 to ensure that the control system 300 stops the host vehicle 100 at the target stop gap position.

At operation 508, the method 500 comprises receiving a driver intervention from HMI2 316 to modify the stop gap. If HMI2 316 is an accelerator pedal, the modification is likely to be a reduction of the stop gap. In an implementation, receiving the driver intervention comprises detecting a torque request from HMI2 316.

The control system 300 may assume that the reason for this intervention is because the driver wants a smaller target stop gap. Alternatively, the control system 300 may prompt the driver to confirm that they wish to update the stored target stop gap.

If the driver instead uses the HMI1 314 to select a new target stop gap while the host vehicle 100 is stopped, the change may be implemented starting from next time the host vehicle 100 stops. Until then, the stopped host vehicle 100 may stay in place without a torque request to immediately move the host vehicle 100 to the new target stop gap.

At operation 510, the control system 300 updates the target stop gap in dependence on the received driver intervention. The updated target stop gap will be implemented again when the vehicle speed later falls below the threshold, for instance each time the host vehicle 100 subsequently stops within the traffic jam.

Operation 510 may comprise measuring the modified stop gap following the driver intervention and a detection that the vehicle is stopped. The measurement could utilize the distance-measuring sensor 312, for example. The measurement could be initiated by the control system 300 when the host vehicle 100 is detected to have stopped. If the host vehicle 100 does not stop, the target stop gap may not be updated despite the host vehicle 100 moving closer to the followed road user 200.

In a first embodiment, the updated target stop gap is the measured stop gap which replaces the previously selected target stop gap. In a second embodiment, the updated target stop gap is towards the measured stop gap but does not necessarily match the measured stop gap.

An example of the second embodiment is where the measured new stop gap is too close to be acceptable for ACC. The control system 300 may determine whether the measured stop gap is below a predetermined minimum stop gap. If the measured stop gap is greater than the minimum, the measured stop gap becomes the updated target stop gap. If the measured stop gap is less than the minimum, the minimum becomes the updated target stop gap.

The minimum stop gap could be a value between 1 metres and 4 metres. The minimum stop gap may be at least slightly less than a smallest target stop gap that is selectable from HMI1 314. This ensures consistent customizability regardless of which stop gap the driver originally selected from HMI1 314.

Operation 512 of the method 500 is an optional operation that limits the use of the updated target stop gap for use only within a same putative traffic jam. Operation 512 comprises determining whether vehicle speed is below a second threshold. A host vehicle 100 travelling faster than the threshold of operation 512 indicates that the traffic jam has ended. The threshold could be a value between approximately 15 kilometres per hour and approximately 40 kilometres per hour. An example is 18 kilometres per hour. In other embodiments, additional checks or different techniques could be used to determine whether the host vehicle 100 has left the traffic jam.

The threshold of operation 512 for determining whether a traffic jam has ended is not related to the speed target of ACC. The threshold of operation 512 may be factory-predetermined, for example, whereas the ACC speed target is driver-determined. In at least some examples the threshold of operation 512 is lower than a minimum selectable ACC speed target because ACC speed targets are for cruising.

For as long as the vehicle speed remains below the threshold of operation 512, the method 500 proceeds to operation 514, which comprises stopping at the updated target stop gap next time the host vehicle 100 stops behind a followed road user 200. The method 500 then loops back to operation 512 to repeatedly check that the vehicle speed remains below the threshold of operation 512.

If the speed of the host vehicle 100 exceeds the threshold of operation 512, the method 500 may revert back to the original (default) target stop gap that had been selected from HMI1 314 by looping back to operation 506. Reverting may comprise forgetting (discarding) the updated target stop gap from HMI2 316. Next time the host vehicle 100 stops, the host vehicle 100 is treated as being in a new traffic jam so the original target stop gap from HMI1 314 is initially used next time the host vehicle 100 stops. The driver is free to again fine-tune the target stop gap using HMI2 316, based on the characteristics of the new traffic jam.

Although not illustrated, additional or alternative means for reverting back to the original target stop gap can be provided. For example, if ACC is inhibited (deactivated) then control could revert back to the original target stop gap next time ACC is activated. ACC could be inhibited by a driver applying vehicle braking, or by actuating an inhibit function such as a digit-operated HMI (e.g. ACC 'cancel' button). Therefore, if the driver wants an updated target stop gap to be forgotten immediately, the driver can easily reset ACC by tapping a brake pedal and then reactivating ACC.

Therefore, in summary, the HMI1 314 is used to select a persistent target stop gap and the HMI2 316 is used to temporarily modify the target stop gap. In the above examples, persistence refers to consistency or permanence over a plurality of traffic jams and/or ACC on/off cycles.

Although embodiments of the present invention have been described in the preceding paragraphs with reference to various examples, it should be appreciated that modifications to the examples given can be made without departing from the scope of the invention as claimed.

For example, HMI2 316 may comprise an accelerator actuator that is not pedal operated but is instead operated via a touchscreen, dial or other equivalent variable control.

For high level automated vehicles lacking a driver-accessible accelerator, HMI2 could be a dedicated control primarily for the adjustment of the target stop gap.

Further, although preceding examples refer to a 'stop gap', the concepts described herein could apply to a slow following scenario in which case the 'stopping vehicle threshold' is replaced with a suitably low speed threshold no faster than 10 km/h.

In another embodiment, the automated mode is different from ACC in one or more respects, but has the minimum features necessary to perform the method.

For purposes of this disclosure, it is to be understood that the controller(s) described herein can each comprise a control unit or computational device having one or more electronic processors. A host vehicle 100 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIG. 4 may represent steps in a method and/or sections of code in the computer program 308. The illustration of a particular order to the blocks does not necessarily imply that there is a required or preferred order for the blocks and the order and arrangement of the block may be varied. Furthermore, it may be possible for some steps to be omitted.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a host vehicle operable in an automated mode, the control system comprising one or more controllers, wherein the control system is configured to:
   receive a driver selection from a first human-machine interface of a vehicle-to-vehicle separation to be implemented in the automated mode when vehicle speed falls below a threshold;
   store the vehicle-to-vehicle separation for implementation in the automated mode when vehicle speed falls below the threshold;
   receive a driver intervention from a second human-machine interface to modify the vehicle-to-vehicle separation; and
   update the stored vehicle-to-vehicle separation based at least in part on the received driver intervention, to be implemented when the vehicle speed later falls below the threshold and the host vehicle is operable in the automated mode.

2. The control system of claim 1, wherein the threshold is a stopping vehicle threshold.

3. The control system of claim 1, wherein the vehicle-to-vehicle separation is selectable from a plurality of selectable values via the first human-machine interface, and wherein the control system is configured to enable, via the driver intervention from the second human-machine interface, adjustment of vehicle-to-vehicle separation between the plurality of selectable values.

4. The control system of claim 1, further configured to enable the updated vehicle-to-vehicle separation to be less than a smallest vehicle-to-vehicle separation selectable from the first human-machine interface.

5. The control system of claim 1, further configured to determine whether the modified vehicle-to-vehicle separation is below a minimum separation, wherein if the modified vehicle-to-vehicle separation is above the minimum separation, the modified vehicle-to-vehicle separation becomes the updated vehicle-to-vehicle separation, and if the modified vehicle-to-vehicle separation is below the minimum separation, the minimum separation becomes the updated vehicle-to-vehicle separation.

6. The control system of claim 1, wherein the automated mode is an adaptive cruise control mode.

7. The control system of claim 1, wherein when vehicle speed is above the threshold, the control system is configured to dynamically control vehicle-to-vehicle separation based at least in part on a vehicle speed-dependent target.

8. The control system of claim 1, wherein the threshold is a first threshold, and wherein the control system is configured to: when vehicle speed rises above a second threshold greater than the first threshold, revert to the vehicle-to-vehicle separation selected from the first human-machine interface when vehicle speed later falls below the first threshold.

9. The control system of claim 1, further configured to:
   detect driver braking or driver actuation of an inhibit function;
   inhibit the automated mode based at least in part on the driver braking or driver actuation; and
   revert to the vehicle-to-vehicle separation selected from the first human-machine interface when the automated mode is later active.

10. The control system of claim 1, wherein the second human-machine interface is configured to request drive torque when actuated.

11. The control system of claim 1, wherein updating the stored vehicle-to-vehicle separation comprises measuring the modified vehicle-to-vehicle separation following the driver intervention and a detection that vehicle speed is below the threshold.

12. A control system for a host vehicle operable in an automated mode, the control system comprising one or more controllers, wherein the control system is configured to:
   store a first vehicle-to-vehicle separation to be implemented in the automated mode when vehicle speed falls below a first threshold;
   receive a driver intervention to modify vehicle-to-vehicle separation;
   update the stored first vehicle-to-vehicle separation based at least in part on the received driver intervention;
   store the updated vehicle-to-vehicle separation to be implemented when the vehicle speed later falls below the first threshold without having exceeded a second threshold; and
   revert to the first vehicle-to-vehicle separation when the vehicle speed later falls below the first threshold after having exceeded the second threshold.

13. A vehicle comprising the control system of claim 1.

14. A method of controlling a host vehicle operable in an automated mode, the method comprising:
   receiving a driver selection from a first human-machine interface of a vehicle-to-vehicle separation to be implemented in the automated mode when vehicle speed falls below a threshold;
   storing the vehicle-to-vehicle separation for implementation in the automated mode when vehicle speed falls below the threshold;
   receiving a driver intervention from a second human-machine interface to modify the vehicle-to-vehicle separation; and
   updating the stored vehicle-to-vehicle separation based at least in part on the received driver intervention, to be implemented when the vehicle speed falls below the threshold and the host vehicle is operable in the automated mode.

15. A non-transitory computer readable medium comprising a computer software that, when executed, is arranged to perform the method according to claim 14.

16. The control system of claim 3, wherein the plurality of selectable values have intervals between 0.25 m to 1 m.

17. The control system of claim 5, wherein the minimum separation is a value between 1 m and 4 m.

18. The control system of claim 8, wherein the second threshold is a value between 15 km/h and 40 km/h.

19. The control system of claim 8, wherein the second threshold is configured to be less than a minimum settable vehicle speed target for the automated mode.

20. The control system of claim 10, wherein the second human-machine interface comprises an accelerator.

* * * * *